United States Patent Office 3,133,893
Patented May 19, 1964

3,133,893
PIGMENT PARTICLES COATED WITH POLYMER AND METHOD OF PREPARING THE SAME
Pauline Newman, New York, N.Y., assignor to American Cyanamid Company, New York, N.Y., a corporation of Maine
No Drawing. Filed July 30, 1957, Ser. No. 675,040
13 Claims. (Cl. 260—41)

This invention relates to the preparation of improved pigments, and more particularly to the manufacture of improved pigment compositions containing titanium dioxide and/or organic pigments suitable for the coloring of plastics, resins, synthetic fibers, and the like, the individual particles of which are coated with a polymer, which polymer is polymerized in situ.

The production of pigmented compositions by adding to the compositions to be colored so-called "color master batches," which consist of a dispersion of pigment and a suitable plastic or resinous material, is in fairly widespread use.

One of the important uses of such color master batches is in the pigmentation of synthetic fibers by the so-called solution dyeing process. The solution dyeing procedure is potentially of great commercial importance because it eliminates almost completely the problems of dyeing synthetic fibers which are notoriously difficult to dye shades that are fast to crocking, fast to washing and fast to light. As is known, the solution-dyeing procedure involves dispersing a pigment into a solution which is to be spun. The solution is extruded and coagulated, and a pigmented fiber is produced which has none of the disadvantages possessed by the conventionally dyed synthetic fibers because the fiber is uniformly colored throughout.

A recent development in this field involves the preparation of a dispersion of a pigment and a solid organic plastic wherein the pigment and plastic are subjected to an intensive milling operation in the presence of a liquid grinding medium which exerts a limited solvent action on the plastic so as to make the plastic receptive to the entrance of the pigment particles. The master color batch so produced can then be incorporated into large batches of plastic for the purpose of coloring the same.

One of the important difficulties of the aforementioned process, however, is that an extensive ball milling operation is required of the order of from 20 to 70 hours' duration. An extensive milling operation is necessary in order to disperse the pigment in particles of pigmentary dimension throughout the plastic mass. Moreover, in order for the pigment to be properly dispersed throughout the plastic, use must be made of a water-miscible solvent which renders the process impractical for the pigmenting of certain synthetic fibers.

In accordance with the present invention, I have found that it is possible to stabilize the pigment in a state of fine dispersion, and in particles of pigmentary dimension, so that the pigment may be readily dispersed in an appropriate resin or resin solution and without recourse to a grinding or milling operation or the use of plasticizers or surfactants, which were heretofore necessary. By state of fine dispersion is meant that the particle size of the color is less than 1.5 microns and mostly between 0.01 and 0.5 micron. The pigment is stabilized against agglomeration or cementation into larger agglomerates, and hence need not be ground or ball milled. This is accomplished by coating the individual pigment particles, which are already of pigmentary size, that is, from 0.01 to 1.5 microns, with a thermoplastic, linear, addition polymer of a compound containing the polymerizable group $$>C=C<$$

as more particularly hereinafter described. Preferably the pigment is coated with a polymer which is identical to or compatible with the composition to be pigmented. The invention is particularly useful in the coloring of fibers containing major proportions of polyacrylonitrile, the pigment may be coated with a polyacrylonitrile coating which readily dissolves in the spinning solution so as to produce homogeneously colored polyacrylonitrile containing fibers upon spinning, as elaborated upon more fully hereinafter.

The polymer-coated pigments of the present invention are readily dispersible in the same or similar resin or a solution thereof, producing an extremely fine and uniform pigment dispersion possessing high chromaticity. The resulting products can be spun, molded or extruded. The polymer-coated pigments, when mixed with appropriate solvents, vehicles or diluents are useful in producing paints, lacquers, printing inks, paper coatings, textile coatings, etc., the resulting surface coating being characterized by fine dispersion and high chromaticity.

It is an advantage of the pigment compositions of the present invention that costly milling of the pigment into the resin is obviated. Uniform dispersion of the pigment into the resin solution may be produced by hand stirring or very mild mechanical stirring which is impossible using the untreated or dry pigments. The novel compositions disperse in the composition to be pigmented in the fine particle size of the original unaggregated pigment particules, thus producing maximum color strength.

It is a further advantage of the present invention that no plasticizer, softener or dispersant is needed to prepare master color batches and which might adversely affect or otherwise contaminate the final product. Moreover, the novel compositions are stable solid dispersions or dry powders with indefinite shelf length and are easy to handle and to blend.

It is a further advantage of the present invention that the method of dispersion used herein allows the use of a large amount, if necessary, of concentrated or pure dispersing agent and which is subsequently removed. The procedure assures good dispersion, in which dispersed state the pigment is then stabilized by the coating operation.

Pigments are usually crystallized from solution in the form of fine crystals ranging in particle size from 0.01 to 1.5 microns. Unfortunately, unless carefully controlled, these fine crystals tend to form aggregates resulting in a loss of color value and, when used for certain operations like the coloring of synthetic fiber dopes, which aggregates tend to clog the openings in the spinneret resulting in stoppage of the spinning operation. These aggregates also cause a loss of tensile strength.

It is a further advantage of this invention that the use of dispersing agents reduces this tendency of the minute pigment crystals to agglomerate or aggregate before they are coated with the polymer during the polymerization step.

I have found that the amount of dispersing agent is not critical. Amounts as low as 5–10% on the weight of the pigment give improved results. Amounts as high as 300–500% on the weight of the pigment also give coated pigments with excellent properties. However, with above about 50% dispersing agent, the dispersing effect is so strong that it is difficult to isolate and to clean the pigment by washing. Therefore, I prefer to use from 5 to 50%.

The color master batches of the present invention composed of the polymer-coated pigments are particularly useful in the production of pigmented synthetic fibers, particularly those of the acrylic type. Yarns and filaments extruded from plastic compositions colored by these materials are not only highly colored and completely uniform, but the small particle size or fineness of the dispersion is such that the tensile strength of the yarn or monofilament is not affected. Extremely fine monofilaments may be spun from a solution of the resin containing the polymer-treated pigments of the present invention without danger of clogging the spinnerette.

Essentially, the present invention involves preparing an aqueous dispersion of the pigment. This may be done in a variety of ways, such as dispersing a pigment press cake in water containing a suitable dispersing agent, or the dispersing agent may be added directly to the press cake and slurried by means of a high-speed stirrer.

Press cakes as contemplated in this application refer to the still wet pigment after it has been synthesized or after it has been conditioned by such treatments as acid pasting, salt grinding, etc., to give minute particle size, and the pigment particles separated from the liquid phase by filtration, sedimentation, centrifugation or equivalent means, but without drying.

Press cakes may vary from 10 to 65% real pigment, the remainder being water, or a water miscible solvent. In this press cake, the tendency to aggregate is held to a minimum and if aggregates are formed, they are very loosely held. Consequently, it is possible to reslurry the press cake in water containing the dispersing agent or the dispersing agent may be added to the press cake. When the latter is done, the mixture is stirred or worked and the bound water (35 to 90%) is freed and a pigment slurry results. This may be used as is or it may be further diluted with water.

The surface energy relationships of fine powders are not too well understood. However, when finely divided pigments are dispersed in a solvent such as water, and the water is evaporated, the individual particles stick to each other in aggregates, and considerable energy is required in grinding operations to overcome these attractive forces. By using press cakes which have never been dried, such agglomeration never occurs, and accordingly the agglomerate does not require breaking, thus saving both the energy required to evaporate the solvent, and the energy required to break up the aggregates. Even with the most vigorous milling, complete dispersion of the agglomerates is difficult, or impossible, and accordingly the use of press cakes gives pigments of higher strength.

In general, the type of dispersant is immaterial. It need be considered only when a polyelectrolyte is being formed or the polymerization proceeds by an ionic mechanism. Otherwise, the dispersant is chosen for its effectiveness in dispersing the particular pigment being coated. Among the suitable dispersants are many of the commercially available cationic, anionic or nonionic surface active agents such as stearamidopropyldimethylhydroxyethyl ammonium chloride, sodium dodecyl sulfonic acid, ethylene oxide-acid condensation products, cetyl pyridinium chloride, bis(2-ethylhexyl)sodium sulfosuccinate, etc. Such dispersants are described and set forth at length in "Synthetic Detergents," John W. McCutcheon, Soap and Chemical Specialties, July, August, September, October 1955.

The monomer or monomers to be polymerized may be emulsified with the pigment, and the polymerization catalyst added slowly, or the catalyst may be emulsified and the monomer or monomers added. In general, I have found that best results are obtained when an aqueous solution of the catalyst is added to an emulsion containing both pigment and monomer, as this appears to result in more intimate contact of the pigment and polymer.

The usual initiators for emulsion polymerization are then added. Examples of suitable polymerization catalysts are ozone, ozonides, inorganic peroxides such as barium peroxide, sodium peroxide, hydrogen peroxide; aliphatic acyl peroxides such as acetyl peroxide, lauryl peroxide, stearyl peroxide; peroxides of the aromatic acid series such as benzoyl peroxide; mixed peroxides such as acetyl benzoyl peroxide, acetyl stearyl peroxide; various per compounds such as perborates, persulfates, perchlorates; aluminum salts such as the halides; organic and inorganic acids such as methacrylic, hydrofluoric; metal compounds of the unsaturated acids such as cobalt and manganese resinates, linoleates, maleates; organic aliphatic and aromatic azo compounds such as azobisisobutyronitrile and many azo dyes. In general, water-soluble catalysts are preferred, and the persulfate-metabisulfite or the persulfate-hydrosulfite systems have been found particularly effective in carrying out the present invention.

The amount of catalyst varies but in general is in the order of 0.1% to 20% by weight of the monomer.

It is a further advantage of the present invention that standard polymerization procedures are employed. The polymerization reaction proceeds smoothly and is completed in a matter of about 2 to 4 hours to produce a high polymer in filterable particles. These particles are then washed free of emulsifier, catalyst, acid, etc., so that essentially only pigment and polymer remain.

Compounds which may be used in the practice of the present invention are unsaturated organic compounds which generally contain the characteristic structure $>C=C<$ and, in most cases, have at least one of the disconnected valences attached to an electronegative group, that is, a group which increases the polar character of the molecule such as a chlorine group or an organic group containing a double or triple bond such as vinyl, phenyl, nitrile, carboxy, carbethoxy, etc. Monomeric compounds containing this structure, when polymerized in aqueous emulsion, generally form thermoplastic, linear, addition polymers. These monomeric materials include ethylene, styrene, acrylic compounds, vinyl and vinylidene compounds, derivatives of these, and may be mono- or polyfunctional. Among the suitable monomers are aryl olefins such as styrene, various alkyl styrenes, p-chloro styrene, p-methoxy styrene, alpha-methyl styrene, alpha-chloro styrene, vinyl naphthalene, acenaphthene, etc.; vinyl esters of saturated and unsaturated, aliphatic and aromatic, monobasic and polybasic acids such as vinyl acetate, vinyl chloroacetate, vinyl propionate, vinyl acrylate, vinyl methacrylate, vinyl oleate, vinyl malonate, vinyl benzoate, mono- and divinyl phthalate, vinyl mono- and divinyl maleate; vinyl ethers (mono or bifunctional) such as methyl vinyl ether, ethyl vinyl ether, divinyl ether, vinyl allyl ether, phenyl vinyl ether, vinyl isobutyl ether; vinyl ketones such as methyl vinyl ketone, ethyl vinyl ketone, methyl isopropenyl ketone; acrylic and substituted acrylic acids and their esters, nitriles, and amides such as acrylic acid, methacrylic acid, ethacrylic acid, alpha-ethacrylic acid, alpha-chloroacrylic acid, alpha-beta-dimethyl acrylic acid, methyl acrylate, ethyl acrylate, methyl alpha-chloro-acrylate, methyl methacrylate, ethyl methacrylate, butyl methacrylate, methyl ethacrylate, ethyl ethacrylate, acrylonitrile, methacrylonitrile, acrylamide, methacrylamide, N-methylacrylamide, N,N-dimethylacrylamide, N-methylolacrylamide, N,N'-methylenebisacrylamide; conjugated dienes such as 1,3-butadiene, isoprene, 2-chloro-1,3-butadiene; alcohols such as allyl alcohol, vinylethinyl alkyl carbinols, 2-chloroallyl alcohol; vinyl halides such as vinyl chloride, vinyl bromide; vinylidene compounds such as vinylidene chloride, vinylidene cyanide; polyfunctional monomers such as diallyl phthalate, divinyl benzene, diallyl melamine, triallyl cyanurate, N,N'-methylenebisacrylamide; and other polymerizable monomers such as vinyl furan, vinyl carbazole, vinyl pyrrolidone, vinyl acetylene, allyl acetate, 2-chloroallyl acetate, diethyl maleate, crotonic acid, maleic acid, vinyl pyridine and other unsaturated hydrocarbons, esters, alcohols, acids, ethers, etc.

The above unsaturated compounds may be polymerized alone, in which case simple linear polymers are formed, or mixtures of two or more of such compounds which are copolymerizable with each other in aqueous emulsion, may be polymerized to form linear copolymers.

Electron microscopical examination of the products treated by the process of the present invention show that the pigment particles, which have an average particle size of the order of 0.2 micron, are in intimate contact with the polymer. Therefore, the particle size of the pigment is controlled so that a coated pigment may be obtained on drying as a powder which may be dispersed in a compatible resinous or plastic material without recourse to the normal grinding or pulverizing operations. The improved pigment compositions of the present invention are compatible with a large variety of systems, such as fibers, plastics, paints, inks, etc.

One of the important uses of the products of the present invention is in the coloration of polyacrylonitrile containing fibers. Thus a suitable pigment may be treated with acrylonitrile and subjected to emulsion polymerization as described hereinabove. The product may be used either in the form of a dry powder or as a wet press cake, depending on the spinning solvent, and the pigment is readily dispersible in the spinning solution containing the acrylic polymer or dope. Frequently, this is a solution of polyacrylonitrile in an aqueous concentrated solution of sodium thiocyanate. The polymer-coated pigment is added to the spinning solution, and the solution is spun and extruded and coagulated in the usual manner. A homogeneously colored fiber is produced.

The amount of pigment used in the master batch may vary from a low of about 30% to a high of about 80% by weight, depending upon the end use.

Organic pigments in general are effective. These pigments may be used alone, in combination, or combined with titanium dioxide. The titanium dioxide serves as a delustrant, and adds its own whiteness to fibers. Accordingly the polymer-coated titanium dioxide is an important product in its own right, as well as the use as a component of a blend of polymer coated pigments. The organic pigments which are useful include:

Phthalocyanine pigments such as: copper phthalocyanine, mono-chlor copper phthalocyanine, hexadecachlor copper phthalocyanine, metal-free phthalocyanine, mono-chlor metal-free phthalocyanine and hexadecachlor metal-free phthalocyanine.

Anthraquinone vat pigments such as:

Vat yellow 6 GL    CI 1127

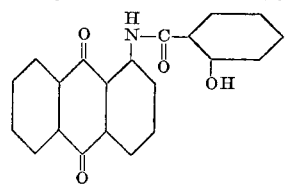

Quinone yellow 18–1    No CI Number

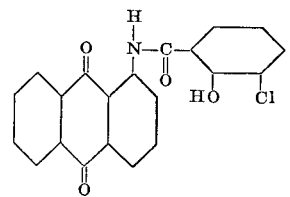

Indanthrone    CI 1106

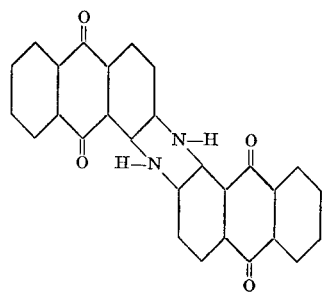

Pyranthrone    CI 1096

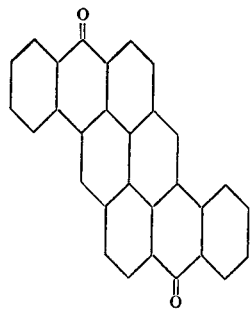

Brominated pyranthrones such as:

Dibromo-pyranthrone

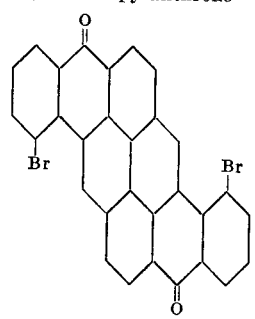

Vat brilliant orange RK

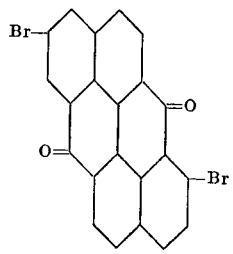

Anthrimide Brown    CI 1151

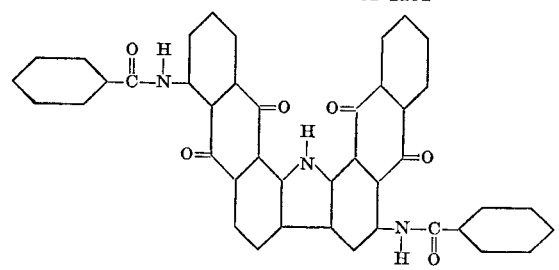

Dibenzanthrone green    CI 1101

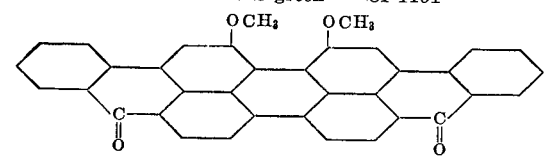

Flavanthrone yellow    CI 1118

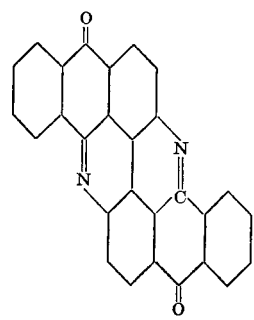

Oxazole red    No CI Number
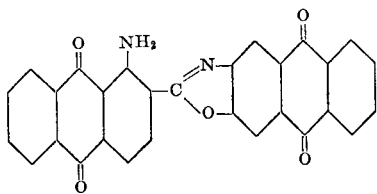
Triazine yellow    No CI Number
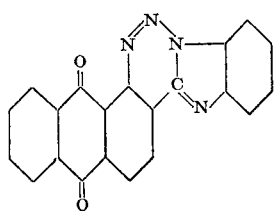
Violet HRN    CI 1104
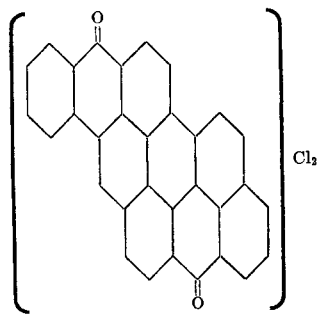
Thioindigo pigments such as:
Thioindigo Red
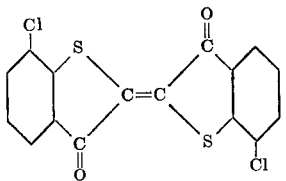
Pink FF
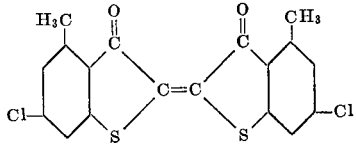
Orange R
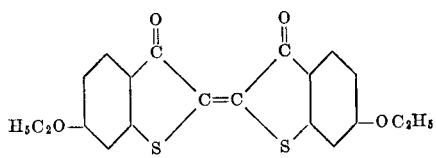
Brown R    (Pigment of Example 4)
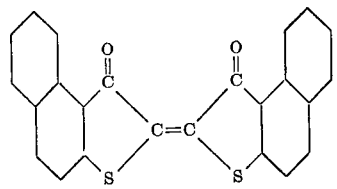
Azo pigments such as:
Toluidine Red    CI 69
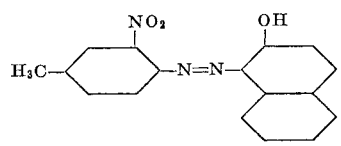
Hansa yellow    No CI Number
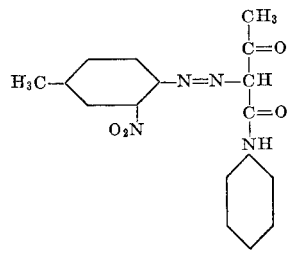
Red Lake C
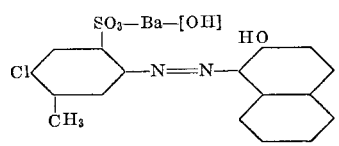
ITR Red    No CI Number
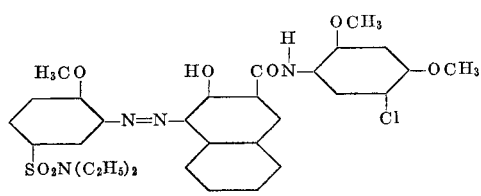
Benzidine yellow
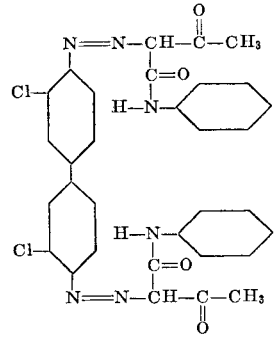
Toner M
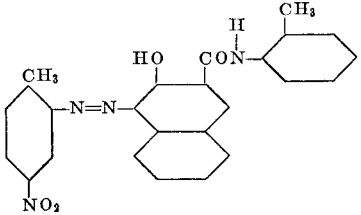
Toner B
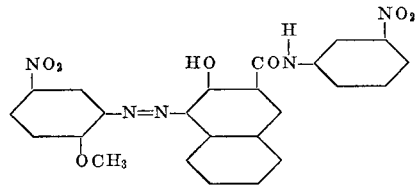

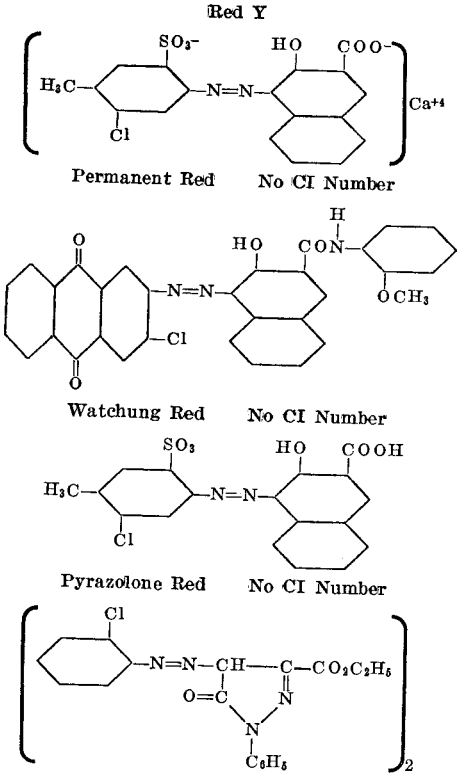

Permanent Red    No CI Number

Watchung Red    No CI Number

Pyrazolone Red    No CI Number

Metalized pigments:

Azo yellow (Green Gold)

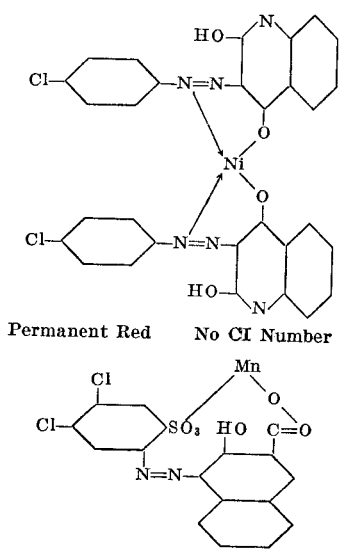

Permanent Red    No CI Number

Other pigments which are formed as press cakes may be used. Some such pigments are set forth in "The Chemistry of Synthetic Dyes and Pigments," Herbert A. Lubs, Reinhold, New York, 1955.

The invention will be described in greater detail in conjunction with the following specific examples.

*Example 1*

Sixty parts of copper phthalocyanine blue presscake containing 35.5% pigment solids are dispersed in 200 parts of 50% stearamidopropyldimethylhydroxyethyl ammonium chloride in aqueous isopropanol solution by adding the dispersing agent gradually to the presscake with rapid stirring until the average particle size of the pigment is less than 0.5 micron with no significant number of larger agglomerates. The resulting viscous dispersion is diluted with 1000 parts of water and placed in a reaction vessel. Forty parts of freshly distilled acrylonitrile are added, and nitrogen is bubbled through the mixture to remove dissolved oxygen. A solution of 0.714 part of ammonium persulfate and 0.434 part of sodium metabisulfite in 100 parts water are added dropwise over a two-hour period, while nitrogen is passed over the surface of the polymerization mixture. The temperature is maintained at 65° C. Polymerization starts almost immediately, and during the course of the reaction gives a milky appearance. After the catalysts are added, the emulsion is allowed to cool, and stirring is continued for a period of two hours. The product is filtered, washed with several volumes of water, and dried to form a highly colored blue powder. Microscopical examination of this product shows that it consists of what may be described as a "dry dispersion" of pigment particles having an average particle diameter of about 0.2 micron, separated and preserved by a coating of polyacrylonitrile. This powder, and also the presscake, are readily dispersible in a spinning solution for acrylic fibers consisting of a copolymer of 95% acrylonitrile and 5% methyl acrylate dissolved in a concentrated aqueous solution of sodium thiocyanate, by manual or very mild mechanical stirring. The resulting homogeneous dispersion in the spinning solution is stable for at least four weeks, with no significant settling, aggregation or flocculation. This colored spinning solution is spun into fiber according to the procedure described in the Cresswell Patent No. 2,558,730. Because of the fine dispersion, the fibers are not weakened, and the spinning processes need not be modified because of the presence of pigment, nor is there any clogging of the spinnerettes due to the pigment. The homogeneously colored blue fiber is subjected to the standard AATCC tests with the following results: No shade change occurs during at least 160 hours of fadeometer exposure, nor is there any change in hue or strength after dry and wet dry cleaning, acid and alkaline perspiration, dry and wet hot pressing, exposure to 0.3% chlorine and cotton wash test No. 4, and no wet or dry crocking or fibrillation. Staining tests conducted against samples of all the currently available material and synthetic fibers result in AATCC ratings of 5 (excellent) in all cases. Microscopical examination of the fiber shows uniform coloration throughout, with an average particle size of less than 0.2 micron and no significant number of larger particles. Because of the excellent dispersion, there is no adverse effect on the tensile strength and other fiber properties due to the presence of the pigment, and one percent pigmentation is found adequate to produce a highly colored blue fiber having the above properties.

Attempts to produce satisfactory dispersions of pigments in the above spinning solution by ball milling an untreated phthalocyanine blue presscake or dry powder for 200 hours are not successful; large numbers of agglomerates which will not pass through the spinnerettes or give maximum color strength remains. The presence of dispersing agents in the ball-milling operation improves the dispersion of the pigment, but the presence of these agents has an adverse effect on the fiber properties and spinning conditions.

*Example 2*

Fifty parts of 1-salicylaminoanthraquinone presscake containing 40% solids are dispersed in 60 parts of 50% aqueous reaction product of a dimeric fatty acid with 273 moles of ethylene oxide. The average pigment particle size of the dispersion is 0.2 micron, with no significant number of agglomerates. The dispersion is diluted with 300 parts of water. Polymerization is carried out following the procedure of Example 1 using 30 parts of acrylonitrile, 0.50 part ammonium persulfate and 0.20 part of sodium metabisulfite. The product is filtered, washed thoroughly, and dried. The resulting yellow powder is readily dispersible by simple stirring in acrylic fiber spinning solutions such as described in Example 1.

The dispersions are stable, and the pigments do not aggregate or flocculate.

A comparable dispersion is not obtainable using an untreated pigment, either as the dry powder or as a wet presscake, in either inorganic or organic spinning solvents, even after prolonged ball milling.

*Example 3*

Sixty parts of rutile titanium dioxide are dispersed in 150 parts of 50% stearamidopropyldimethylhydroxyethyl ammonium chloride by rolling overnight in a pebble mill. The average pigment particle size of the dispersion is about 0.2 micron, with no significant number of aggregates. No aggregation or flocculation occurs on diluting the dispersion with 1000 parts of water. Following the procedure of Example 1, 30 parts of acrylonitrile are added while the system is purged of air and polymerized at 45° C. by adding a solution of 0.75 part ammonium persulfate and 0.40 part sodium metabisulfite dropwise over a two-hour period. The temperature is then raised to 60° C. for 15 minutes, and after cooling, washing thoroughly and drying, a white powder is obtained. The product is readily dispersible by hand stirring or mild mechanical agitation in the acrylic fiber spinning solution used in Example 1 and has a delustering effect on the fiber. The product is also readily dispersible in the spinning solvents dimethyl formamide, gamma-butyrolactone, ethylene carbonate and acetonitrile. The product also readily disperses in printing ink systems. The product is very effective when blended with organic colored polymer coated pigments, for use in fiber manufacture.

*Example 4*

The procedure of Example 1 is repeated using the following materials: 30 parts of 4,5,4',5'-dibenzthioindigo presscake dispersed in 30 parts of 50% stearamidopropyldimethylhydroxyethyl ammonium chloride, 20 parts acrylonitrile, 0.50 part ammonium persulfate, 0.24 part sodium metabisulfite, and 400 parts water. After a brief induction period polymerization proceeds rapidly. The product is a brown powder which is readily dispersible in dimethylformamide spinning solvent and is useful in coloring acrylate and other types of plastics.

*Example 5*

Fifteen parts of copper phthalocyanine presscake containing 35% solids are dispersed in 50 parts of 25% bis(2-ethylhexyl)-sodium sulfosuccinate. The resulting dispersion exhibits an average pigment particle size of 0.2–0.5 micron. It is diluted with 150 parts of water and placed in a reaction vessel as in Example 1. To the vessel are charged 1.0 part 0.1 N-sulfuric acid, 0.18 part ammonium persulfate, and 0.07 part sodium metabisulfite. The mixture is stirred for 30 minutes, purged of air and the temperature is adjusted to 35° C. There are then added 9 parts acrylamidopropylbenzyldimethyl ammonium chloride solution (4 parts dry) and 10 parts purified acrylonitrile (9 parts dry). After a brief induction period the reaction begins, as evidenced by a slight rise in temperature. The temperature is maintained at 40° C. for 3 hours, then raised to 70° C. for one hour. After cooling, the product is filtered, washed and dried to produce a highly colored blue solid. The product is readily dispersible by hand stirring in a spinning solution composed of a copolymer of acrylonitrile and 5% methyl acrylate dissolved in a concentrated aqueous solution of sodium thiocyanate.

*Example 6*

Sixty parts of rutile titanium dioxide powder are dispersed in 150 parts of 50% stearamidopropyldimethylhydroxyethyl ammonium chloride as in Example 3. The dispersion is placed in a reaction vessel as in Example 1, and is diluted with 1000 parts of water. After purging the mixture of air, 70 parts of methyl vinyl ketone (containing 2% hydroquinone) are added. The pH is adjusted to 3 with dilute sulfuric acid. Polymerization is carried out at 40° C., following the procedure of Example 1, using as catalyst a solution of 2.000 parts ammonium persulfate and 1.00 parts sodium metabisulfite in 200 parts water. Polymerization proceeds smoothly after a brief induction period, to produce a white powder. The product of this example is readily dispersible in cellulose acetate spinning solution composed of cellulose acetate dissolved in acetone and in Dynel spinning solution composed of a copolymer 40/60 of acrylonitrile/vinyl chloride, dissolved in acetone, and the product is also useful in water emulsion paints and textile printing pastes.

*Example 7*

One hundred parts of 1-salicylaminoanthraquinone presscake containing 40% pigment solids are dispersed in 50 parts of an aqueous emulsion containing 8% p-hexadecyl phenyl ether of polyethylene glycol. The resulting viscous paste is diluted with 1000 parts of water and placed in a reaction vessel as in Example 1. After purging of dissolved oxygen, the polymerization is conducted as follows: 0.80 part of benzoyl peroxide are emulsified in the polymerization vessel. The temperature is raised to 60° C. and a concentrated emulsion containing 50 parts water, 10 parts p-hexadecyl phenyl ether of polyethylene glycol, twenty parts vinyl acetate, and 20 parts acrylonitrile is added dropwise over a two-hour period. The polymerization proceeds smoothly, and the product is filtered, washed and dried to produce a yellow solid. The product is readily dispersible in an acetone solution of Dynel as well as a cellulose acetate spinning solution.

*Example 8*

Fifty parts of benzidine yellow presscake containing 40% pigment solids are dispersed in 100 parts of 50% stearamidopropyldimethylhydroxyethyl ammonium chloride, diluted with 100 parts water, and charged to an apparatus as in Example 1. The average pigment particle size is less than 0.5 micron, with no significant number of agglomerates. To the reaction vessel are added 3.2 parts of 10% ferrous sulfate solution and 10 parts 1 N-sulfuric acid. After bubbling nitrogen through the mixture for 1 hour, 50 parts of methacrylic acid are added. The temperature inside the vessel is adjusted to 30° C. Nitrogen is passed continuously over the surface, and there is added dropwise 2.7 parts of 3% hydrogen peroxide. Stirring is continued for an additional 3 hours, after which time the polymeric product is precipitated by the addition of acetone, filtered, and washed with aqueous acetone. The product is a yellow solid which is easily dispersible in viscose spinning solutions and alkaline latex emulsion paints.

*Example 9*

The above procedure is repeated with the sole exception that methylmethacrylate is used instead of the methacrylic acid used in Example 8. The product of this example is useful as a color master batch for coloring plastics and molding powders.

*Example 10*

One hundred parts of manganese lake of 3,4-dichloroaniline sulfonic acid coupled on beta-oxynaphthoic acid presscake containing 40% pigment solids are dispersed in 50 parts of 8% p-hexadecyl phenyl ether of polyethylene glycol. The dispersion is diluted with 1000 parts water and placed in the apparatus used in Example 1. To this dispersion is added 0.50 part benzoyl peroxide and the mixture is stirred for three hours to dissolve the catalyst in the emulsifying solution, during which time the system is purged of dissolved air. Twenty-five parts maleic anhydride and 25 parts vinyl acetate are added, and the stirring is continued for one-half hour. The reaction mixture is then heated slowly to 60° C. and maintained at that temperature for 3 hours, then cooled, filtered, washed and dried. A portion of the product is partially hydrolyzed by heating to 50° C. with an equivalent amount of sodium hydroxide for 1 hour. The resulting salt is neutralized with hydrochloric acid, precipitated, filtered and washed. Both the hydrolyzed and unhydrolyzed products are dispersible in viscose and acetate spinning solutions and water emulsion paints.

*Example 11*

One hundred parts manganese lake of 3,4-dichloroaniline sulfonic acid coupled with beta-oxynaphthoic acid presscake are dispersed in 50 parts of 8% p-hexadecylphenyl ether of polyethylene glycol. Forty parts of N,N-methylenebisacrylamide are added, and the polymerization carried out as in Example 1. The product obtained is dispersible in water emulsion paints.

*Example 12*

One hundred parts 1-salicylaminoanthraquinone presscake are dispersed in 50 parts of 8% p-hexdecyl phenyl ether of polyethylene glycol. The resulting dispersion is diluted with 1000 parts water and placed in the apparatus of Example 1. The mixture is purged of air. Thirty-five parts vinyl acetate and 35 parts methyl methacrylate are added, and the stirring continued for one-half hour. The temperature is raised to 60° C. A solution of 1.40 parts ammonium persulfate and 0.70 part sodium metabisulfite in 100 parts water are added dropwise over a one-hour period, during which time the temperature is maintained at 60–65° C. The mixture is allowed to cool, and is diluted with water and a saturated sodium chloride solution, thereafter filtered, washed thoroughly and dried. The product is dispersible in cellulose acetate and Dynel spinning solutions.

*Example 13*

One hundred parts of phthalocyanine blue presscake are dispersed in 200 parts of 50% stearamidopropyldimethylhydroxyethyl ammonium chloride. Twenty-five parts freshly distilled methyl vinyl ketone and 25 parts freshly distilled acrylonitrile are added to the polymerization vessel, and the polymerization is carried out as in Example 1. The product of this example has the same desirable characteristics as the product of Example 1 and is readily dispersible in Dynel spinning solutions.

*Example 14*

One hundred parts of phthalocyanine blue presscake are dispersed by simple stirring in 200 parts of a 50% solution of sodium dodecyl sulfonate. Fifty parts of N-octylacrylamide are added, and the polymerization is carried out as in Example 1. The product of the example has the same desirable characteristics as the product of Example 1.

*Example 15*

One hundred thirty-nine parts of copper phthalocyanine blue presscake containing 36% pigment solids (and the rest water) are dispersed in 100 parts of water with 9 parts of 50% stearamidopropyldimethylhydroxyethyl ammonium chloride in isopropanol; and the mixture is stirred with a high speed impeller (Eppenbach stirrer) until the average particle size of the pigment is less than 0.5 micron with no significant number of large agglomerates. The resulting viscous dispersion is diluted with 300 parts of water, with additional stirring. Sixty-five parts of freshly distilled acrylonitrile are added and nitrogen is bubbled through the mixture to remove dissolved oxygen, and the dispersion is gradually heated to 55° C. over a period of one hour. A solution of 7.14 parts ammonium persulfate and 4.34 parts sodium hydrosulfite in 100 parts of water are added dropwise over a 2-hour period. The temperature is maintained between 62° C. and 68° C. for the 2-hour period while dropping the catalyst solution. (The reaction is exothermic.) Polymerization starts almost immediately and during the course of the reaction gives a milky appearance. The polymerized polymer and pigment mixture is held at 62° for another 60 minutes; then cooled to about room temperature of 20° C., filtered and washed with several thousand parts of tap water. The resulting filter cake is air dried at 60° C. for 24 hours, to a constant weight yield of 100 parts. The cake is crushed by rolling in a pebble mill. The resulting powder contains 48% real pigment and 52% polymer.

This pigment is readily dispersible in a dope comprising an acrylonitrile polymer by mild agitation.

When used to color said acrylonitrile polymer-containing dope (sold under the trademark "Creslan") at 1% pigment content (solids basis) which is cast as a film; a color value is obtained of 182% against a film from a dope prepared by conventional ball milling of the dry pigment in the dope, and casting, using the same pigment concentration.

*Example 16*

The procedure of Example 15 is repeated except 5 parts of dispersing agent is used. The resulting powder contains 45% pigment and 55% polymer. It has a color value of 146% versus the ball milled standard.

*Example 17*

Five hundred fifty-six parts of copper phthalocyanine blue presscake containing 36% pigment solids (and the rest water) are dispersed in 200 parts of water with 36 parts of 50% stearamidopropyldimethylhydroxyethyl ammonium chloride in isopropanol; and the mixture is stirred with a high speed impeller (Eppenbach stirrer) until the average particle size of the pigment is less than 0.5 micron with no significant number of large agglomerates. The resulting viscous dispersion is diluted with 1200 parts of water, with additional stirring. 67.2 parts of freshly distilled acrylonitrile are added and nitrogen is bubbled through the mixture to remove dissolved oxygen, and the dispersion is gradually heated to 55° C. over a period of one hour. A solution of 14.28 parts ammonium persulfate and 8.68 parts sodium hydrosulfite in 200 parts of water are added dropwise over a 2-hour period. The temperature is maintained between 67° C. and 78° C. for the 2-hour period while dropping the catalyst solution. (The reaction is exothermic.) Polymerization starts almost immediately and during the course of the reaction gives a milky appearance. The polymer pigment mixture is cooled to room temperature, filtered and washed with 8000 parts of tap water. The resulting filter cake is air dried at 60° C. for 24 hours, to a constant weight yield of 255 parts. The cake is pulverized in a mortar. The resulting powder contains 74% real pigment and 26% polymer.

*Example 18*

Twenty-five parts of dry 2,4-dihydroxy-3-(para-chlorophenylazo)quinoline, half nickel chelate are slurried in 100 parts water containing 2.25 parts of 50% stearamidopropyldimethylhydroxyethyl ammonium chloride in isopropanol. The emulsion polymerization is carried out as in Example 17 using proportionate amounts and gives a yield of 30.7 parts, containing 75% real pigment and 25% of the polymer. The polymer coated pigment is easily dispersed by mild stirring in a dope comprising an acrylonitrile polymer.

*Example 19*

Eighty-three parts of titanium dioxide presscake containing 50 parts titanium dioxide is coated as in Example 17. The yield is 66 parts of a product containing 77% pigment and 23% polymer.

When this was made into a film comprising 1% pigment, the coated pigment gave a better opacity to the film than a control standard of ball milled pigment.

This application is a continuation-in-part of my application Serial Number 420,210, filed March 31, 1954, "Preparation of Coated Pigments," now abandoned in favor of this application.

I claim:
1. A process of producing phthalocyanine blue pigmented color master batches of polyacrylonitrile coated copper phthalocyanine pigment which comprises dispersing about 139 parts copper phthalocyanine blue press cake containing about 36% pigment solids and the rest water in about 100 parts water with about 9 parts of 50% stearamidopropyldimethylhydroxyethyl ammonium chloride in isopropanol, stirring until the average particle size of the pigment is less than about 0.5 micron, diluting with about 300 parts water, adding, under nitrogen, about 65 parts freshly distilled acrylonitrile, heating gradually to about 55° C., adding a solution of about 7.14 parts of ammonium persulfate and about 4.34 parts of sodium hydrosulfite in about 100 parts of water slowly over about a two hour period, while maintaining the temperature between abut 62° C. and 68° C., holding at about 62° C. for about an hour, cooling to abut 20° C., filtering, washing the filter cake with at least several thousand parts of water, thereby washing out the stearamidopropyldimethylhydroxyethyl ammonium chloride, isopropanol, and other water soluble impurities, drying, and then crushing the resultant filter cake.

2. A process of producing phthalocyanine blue pigment the copper phthalocyanine particles of which are coated with polyacrylonitrile which comprises dispersing copper phthalocyanine blue press cake in water with stearamidopropyldimethylhydroxyethyl ammonium chloride as a dispersing agent, stirring until the copper phthalocyanine is deflocculated and the average particle size of the pigment is less than about 0.5 micron, adding freshly distilled acrylonitrile, heating to about 55° C., adding ammonium persulfate and sodium hydrosulfite as a catalyst slowly while maintaining the temperature between about 62° C. and 68° C., the polymerization medium being a single liquid phase of acrylonitrile dissolved in water initially, and the dissolved acrylonitrile polymerizing out on the surface of the pigment particles to form pigment particles which are substantially individually coated with polyacrylonitrile, cooling the reaction medium to about 20° C., filtering, washing the filter cake with water thereby washing out the stearamidopropyldimethylhydroxyethyl ammonium chloride and other impurities, drying, and crushing the resultant filter cake.

3. A process of producing pigmented color master batches which comprises dispersing in wet press cake form a pigment selected from the group consisting of amino-anthraquinone pigments, phthalocyanine pigments, thioindigo pigments, benzidine pigments, azoic lake pigments, and titanium dioxide pigments, in submicron size, from 0.01 to 1.5 microns, in water in the presence of a dispersant, adding acrylonitrile and a polymerization catalyst therefor to the aqueous pigment dispersion, and polymerizing the monomer in the presence of the aqueous pigment dispersion whereby the pigment is transferred from the aqueous phase to the polymer phase while retaining the dispersion of the pigment in said 0.01 to 1.5 micron size, the quantity of said monomer being such that the final product contains from 30% to 80% pigment, separating the polymer coated pigment from the aqueous medium, and washing the polymer coated pigment particles free from said dispersant.

4. A process of producing pigmented color master batches which comprises dispersing in wet press cake form a pigment selected from the group consisting of amino-anthraquinone pigments, phthalocyanine pigments, thioindigo pigments, benzidine pigments, azoic lake pigments, and titanium dioxide pigments, in submicron size, from 0.01 to 1.5 microns, in water in the presence of a dispersant, adding methyl methacrylate and a polymerization catalyst therefor to the aqueous pigment dispersion, and polymerizing the monomer in the presence of the aqueous pigment dispersion whereby the pigment is transferred from the aqueous phase to the polymer phase while retaining the dispersion of the pigment in said 0.01 to 1.5 micron size, the quantity of said monomer being such that the final product contains from 30% to 80% pigment, separating the polymer coated pigment from the aqueous medium, and washing the polymer coated pigment particles free from said dispersant.

5. A process of producing pigmented color master batches which comprises dispersing in wet press cake form a pigment selected from the group consisting of amino-anthraquinone pigments, phthalocyanine pigments, thioindigo pigments, benzidine pigments, azoic lake pigments, and titanium dioxide pigments, in submicron size, from 0.01 to 1.5 microns, in water in the presence of a dispersant, adding methacrylic acid and a polymerization catalyst therefor to the aqueous pigment dispersion, and polymerizing the monomer in the presence of the aqueous pigment dispersion whereby the pigment is transferred from the aqueous phase to the polymer phase while retaining the dispersion of the pigment in said 0.01 to 1.5 micron size, the quantity of said monomer being such that the final product contains from 30% to 80% pigment, separating the polymer coated pigment from the aqueous medium, and washing the polymer coated pigment particles free from said dispersant.

6. A process of producing pigmented color master batches which comprises dispersing in wet press cake form a pigment selected from the group consisting of amino-anthraquinone pigments, phthalocyanine pigments, thioindigo pigments, benzine pigments, azoic lake pigments, and titanium dioxide pigments, in submicron size, from 0.01 to 1.5 microns, in water in the presence of a dispersant, adding vinyl acetate and a polymerization catalyst therefor to the aqueous pigment dispersion, and polymerizing the monomer in the presence of the aqueous pigment dispersion whereby the pigment is transferred from the aqueous phase to the polymer phase while retaining the dispersion of the pigment in said 0.01 to 1.5 micron size, the quantity of said monomer being such that the final product contains from 30% to 80% pigment, separating the polymer coated pigment from the aqueous medium, and washing the polymer coated pigment particles free from said dispersant.

7. A process of producing pigmented color master batches which comprises dispersing in wet press cake form a pigment selected from the group consisting of amino-anthraquinone pigments, phthalocyanine pigments, thioindigo pigments, benzidine pigments, azoic lake pigments, and titanium dioxide pigments, in submicron size, from 0.01 to 1.5 microns, in water in the presence of a dispersant, adding N-octylacrylamide and a polymerization catalyst therefor to the aqueous pigment dispersion, and polymerizing the monomer in the presence of the aqueous pigment dispersion whereby the pigment is transferred from the aqueous phase to the polymer phase while retaining the dispersion of the pigment in said 0.01 to 1.5 micron size, the quantity of said monomer being such that the final product contains from 30% to 80% pigment, separating the polymer coated pigment from the aqueous medium, and washing the polymer coated pigment particles free from said dispersant.

8. A process of producing pigmented color master batches which comprises dispersing in wet press cake form a pigment selected from the group consisting of aminoanthraquinone pigments, phthalocyanine pigments, thioindigo pigments, benzidine pigments, azoic lake pigments, and titanium dioxide pigments, in submicron size, from 0.01 to 1.5 microns, in water in the presence of a dispersant, adding a monomer selected from the group consisting of acrylonitrile, methyl methacrylate, mathacrylic acid, vinyl acetate, N-octylacrylamide, maleic anhydride and vinyl acetate, N,N-methylenebisacrylamide, methyl vinyl ketone and acrylonitrile, and mixtures thereof, and a polymerization catalyst therefor to the aqueous pigment dispersion, and polymerizing the monomer in the presence of the aqueous pigment dispersion whereby the pigment is transferred from the aqueous phase to the polymer phase while retaining the dispersion of the pigment in said 0.01 to 1.5 micron size, the quantity of said monomer being such that the final product contains from 30% to 80% pigment, separating the polymer coated pigment from the aqueous medium, and washing the polymer coated pigment particles free from said dispersant.

9. A process according to claim 8 in which the pigment is copper phthalocyanine.

10. A process according to claim 8 in which the pigment is 1-salicylaminoanthraquinone.

11. A process according to claim 8 in which the pigment is benzidine yellow.

12. A process according to claim 8 in which the pigment is titanium dioxide.

13. A process according to claim 8 in which the pigment is the manganese lake of 3,4-dichloroaniline sulfonic acid coupled on beta-oxynaphthoic acid.

References Cited in the file of this patent

UNITED STATES PATENTS

| | | |
|---|---|---|
| 2,171,765 | Rohm et al. | Sept. 5, 1939 |
| 2,500,023 | Burk | Mar. 7, 1950 |
| 2,512,697 | Te Grotenhuis | June 27, 1950 |
| 2,537,334 | De Nie | Jan. 9, 1951 |
| 2,650,168 | Van Dijk et al. | Aug. 25, 1953 |
| 2,793,195 | Vesce | May 21, 1957 |
| 2,865,880 | Caldwell | Dec. 23, 1958 |

OTHER REFERENCES

Soap and Chemicals Specialties, July 1955, page 53.